Patented Apr. 16, 1935

1,997,750

UNITED STATES PATENT OFFICE 1,997,750

COMPOSITION FOR THE DESTRUCTION OF UNDESIRED VEGETATION

Vincent Sauchelli, Pittsburgh, Pa., assignor to The Koppers Company of Delaware, a corporation of Delaware No Drawing. Application October 10, 1931, Serial No. 568,213

3 Claims. (Cl. 167—45)

This invention relates to a composition for the destruction of weeds or undesired vegetation.

It is well known that weeds interfere seriously with the proper growth of crops and add to the cost of crop production. It is also well known that weeds harbor insects and fungus pests destructive or injurious to economic plants and that they also are sometimes poisonous and may endanger the health and life of men and animals. Weeds may be classified as annuals, biennials, and perennials. Often these require different types of treatment in order to exterminate them. A good chemical weed killer is one which when applied will effectively destroy weeds in any of these three classes. It should not only destroy the top growth but should be readily carried down to the extremities of the roots and root stocks and bring about the destruction of the entire plant.

Furthermore, a good chemical weed killer for agricultural use should be inexpensive and should be easy and safe to apply. It should also be effective at low concentrations, relatively non-poisonous to man and animals, and easily decomposible in the soil so that it loses its toxicity within a reasonable period of time. If it also has insecticidal and bactericidal attributes its commercial value is thereby enhanced.

In accordance with the present invention, a chemical weed killer having the above characteristics to a marked degree, is provided.

The product of the present invention comprises ammonium thiocyanate, and more particularly crude ammonium thiocyanate, obtained in the production of fuel gases, such as coke-oven gas. Fuel gases containing free ammonia, hydrogen sulphide, and hydrogen cyanide are scrubbed to remove these constituents by contacting the gases with water in which is suspended sulphur, or with ammoniacal liquor containing sulphur, or with a solution of ammonium polysulphide. In each of these instances a liquor is produced containing ammonium thiocyanate.

It has been found that this liquor may be withdrawn from the gas-purification system and that it contains constituents in such proportions and of such characteristics that it may be used directly as a weed killer or for the destruction of unwanted vegetation.

The liquor withdrawn from a gas-purification system comprises primarily a solution of ammonium thiocyanate and several other chemicals which may or may not be present, depending upon the nature of the gas. The liquor may contain in addition to ammonium thiocyanate small amounts of sodium thiosulphate, sodium carbonate or sodium thiocyanate. They may also contain small amounts of light oils or tar acids. The nature of the liquor is such that it effectively wets leaves of plants so as to bring about proper contact with the plant-detroying chemicals. The liquor adheres well to narrow leaves as well as broad leaves.

The following may be considered as a representative analysis of raw liquor obtained from gas purification plants:

| | Per cent by weight |
|---|---|
| Ammonium thiocyanate | 25–35 |
| Sodium thiocyanate | 0.5 |
| Ammonia | 0.65 |
| Sodium thiosulphate | 3–7 |
| Sodium carbonate | 0.6 |
| Iron as $Fe_2O_3$ | 0.05–0.20 |

The balance of the liquor comprises water, oily materials and less important ingredients.

The raw liquor may be concentrated by evaporation. Crude ammonium thiocyanate crystals may be obtained by evaporation of the liquor followed by crystallization and filtering. The crude crystals have approximately the following composition:

| | Per cent by weight |
|---|---|
| Ammonium thiocyanate | 92–94 |
| Sodium thiosulphate | 1–2 |
| Iron as $Fe_2O_3$ | 0.05–0.10 |

The raw liquor or a solution of ammonium thiocyanate may be applied to vegetation by spraying under pressure to thoroughly wet the plants and the soil around them. A solution containing about two pounds of ammonium thiocyanate per gallon of water has been found very effective. One gallon of such solution may be applied to each one-half square rod of land.

My weed killer composition is best applied in hot weather. Wilting of plants occurs within several hours after application and complete sterilization of the soil within two or three days.

My weed killer composition may be readily mixed with other well-known weed killing chemicals and in certain instances an improved composition is obtained. My composition, for instance, may be mixed with sodium chlorate to remove certain objectionable features of the latter chemical.

The composition of the present invention readily destroys such weeds as bind weed, Russian knapweed, quack grass, crab grass, Canada thistle, Johnson grass, wild morning glory, poison ivy, rag weed, chicory, dandelion, plantains, iron weed, lamb's quarters, fox tail, and also such noxious weeds as field garlic, milk weed and horse nettle. Trees may be destroyed by making incisions in the trunks and injecting solutions of ammonium thiocyanate into the incisions. The solution is conveyed throughout the circulatory system of the plant and causes death of the entire plant structure.

There are certain outstanding advantages in the use of my weed killer composition, the principal among which are that it can be applied in regions of low humidity, it is not a poison to man or live-stock when used in the concentrations mentioned above, and it is not a fire hazard. An outstanding advantage is that ammonium thiocyanate when it decomposes in the soil does not leave behind an undesirable chemical, but on the contrary it adds nitrogen to the soil, thus making it profitable to use where a sterilized area is to be seeded down for field crops.

I claim as my invention:

1. A herbicidal composition comprising essentially ammonium thiocyanate.

2. A composition for destroying undesired vegetation, which composition comprises a by-product crude ammonium thiocyanate obtained in the liquor resulting from the purification of fuel gases of constituents thereof with wash liquor.

3. A composition for destroying undesired vegetation, which composition comprises an aqueous solution of ammonium thiocyanate obtained in by-product washing of fuel gas with scrubbing liquid.

VINCENT SAUCHELLI.